Jan. 6, 1970  C. B. DAHL  3,487,720
DEVICE FOR DAMPING FLEXURAL VIBRATION OF ROTATING SHELL
Filed Feb. 28, 1968  2 Sheets-Sheet 1
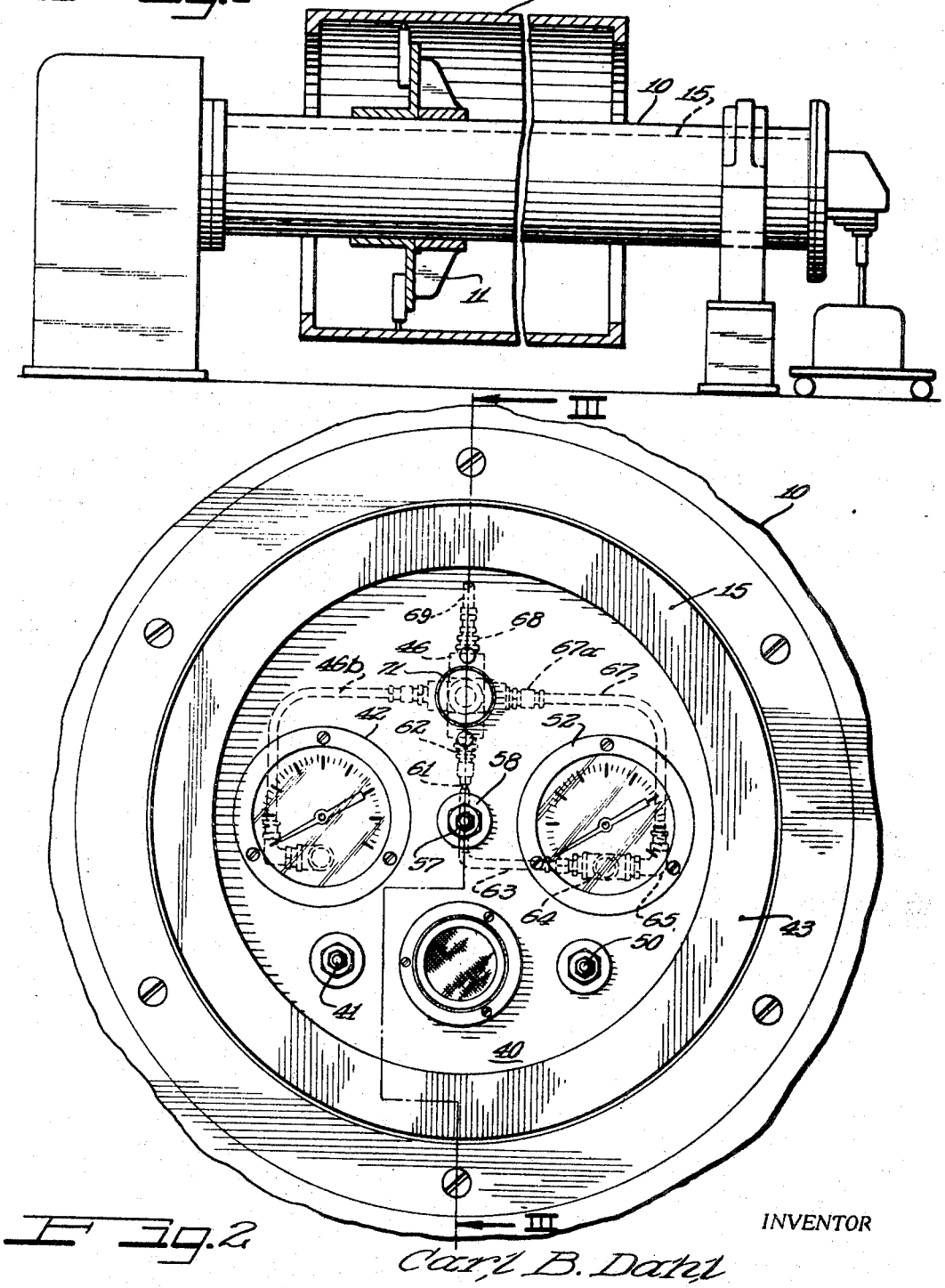
INVENTOR
Carl B. Dahl
BY Hill, Sherman, Meroni, Gross & Simpson
ATTORNEYS

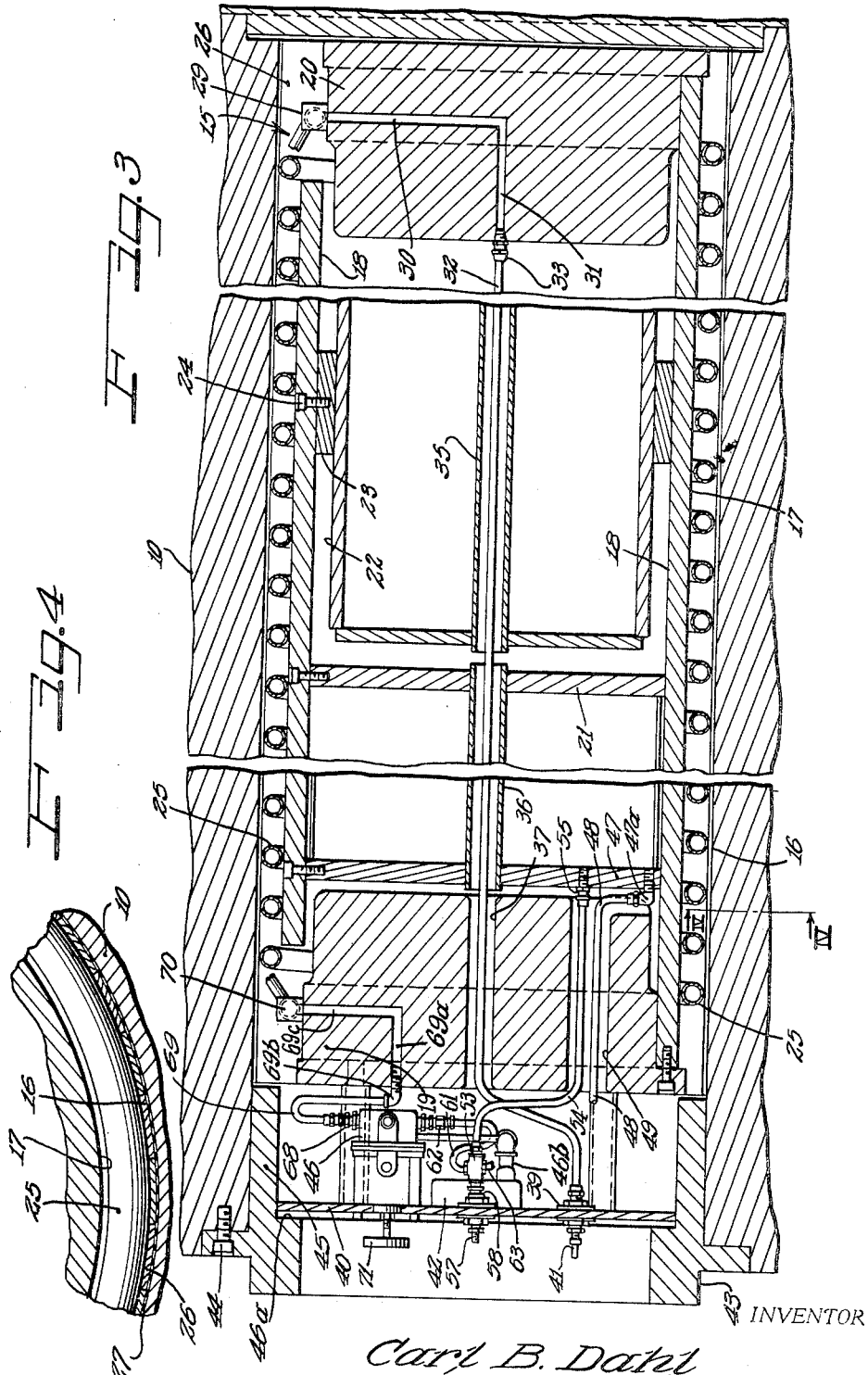

United States Patent Office 3,487,720
Patented Jan. 6, 1970

3,487,720
DEVICE FOR DAMPING FLEXURAL VIBRATION OF ROTATING SHELL
Carl B. Dahl, Rockton, Ill., assignor to Beloit Corporation, Beloit, Wis., a corporation of Wisconsin
Filed Feb. 28, 1968, Ser. No. 709,120
Int. Cl. F16f 15/12
U.S. Cl. 74—574                                      18 Claims

ABSTRACT OF THE DISCLOSURE

Energy absorbing device for damping flexural vibration of a rotary boring bar to reduce the magnitude of tool chatter. The device is in the form of a hollow beam, cylindrical in cross-section, insertable within the boring bar, or any other device in which it is desired to damp flexural vibration. The beam has a visco-elastic tube coiled about its periphery. One end of the tube is sealed. The other end of the tube is connected to an adjustable air supply consisting of a storage tank contained within the beam and a pressure regulator connected from the tank to the tube to supply air to the tube at a regulated pressure. Metal slats extend along the periphery of the tube for the length of the tube and are loosely placed between the tube and hollow interior of the boring bar, in side-by-side relation with respect to each other, and are forced against the inside of the boring bar upon inflation of the tube. The slats may be laminated with a visco-elastic material engaging the inside of the boring bar. Weights are placed along the hollow beam to provide an optimum natural frequency vibration ratio between the beam and the boring bar in such a manner that the increments of length of the boring bar subjected to the largest amplitudes of transverse vibration will be subjected to the largest damping forces.

SUMMARY OF THE INVENTION AND OBJECTS

The flexural vibration damper of the present invention damps vibration by placing an inner beam within a boring bar or other rotating shell, in which a visco-elastic tube is coiled about the beam, and metal slats laminated with a visco-elastic material are interposed between the periphery of the tube and the inner periphery of the boring bar, to absorb energy by the shearing action that takes place in the visco-elastic sheet as a result of differential strain between the slats and boring bar upon flexural motion of the boring bar. The damping means can be adjusted to optimum conditions for each of a variety of operating situations by changing the air pressure in the tube and energy absorbing masses in the form of weights are proportioned along the length of the boring bar, such that the increments of length of the boring bar subjected to the largest amplitudes of transverse vibration, will be subjected to the largest damping forces.

A principal object of the invention is to provide a more effective vibration damper for damping tool chatter of boring bars and the like, having the versatility necessary to adapt itself to a wide variety of conditions under which the boring bar is required to operate.

Another object of the present invention is to provide a simple and effective means for reducing vibration and chatter in boring bars and the like, in which flexural vibration of the boring bar is absorbed by an elastic tube coiled about a beam extending along the hollow interior portion of the boring bar, and inflated to optimum energy absorbing conditions.

A further object of the invention is to provide a distributing damping means along the length of a boring bar and the like, proportioned so that the increments of length of the boring bar subjected to the largest amplitudes of transverse vibration will be subjected to the largest damping forces, in which the damping means can be adjusted to optimum conditions over a wide variety of operating situations by inflating an elastic tube, extending along a hollow beam within the hollow interior of the boring bar and by varying the pressure in the tube in accordance with the damping conditions required.

A still further and important object of the invention is to provide a flexural vibration damper for hollow rotating members, such as rolls, boring bars and like devices, in the form of a hollow beam having weights therein along the length of the beam to provide mass at selected locations along the beam, where the amplitudes of transverse vibration will be the greatest, and to coil a visco-elastic inflatable tube about the beam and along the interior of the rotating member, in which metal slats laminated with a visco-elastic material are interposed between the visco-elastic tube and the hollow interior portion of the beam and are forced against the inside of the rotating member by inflation of the tube, to damp vibration by the differential strain between the slats and the member, when flexural motion of the member occurs.

These and other objects of the invention will appear from time to time as the following specification proceeds and with reference to the accompanying drawings wherein:

FIGURE 1 is a view in side elevation of a conventional boring bar showing a tool holder on the bar in generally longitudinal section in the operation of boring the interior of a large diameter cylinder, shown in generally longitudinal section;

FIGURE 2 is a fragmentary end view of the boring bar, shown in FIGURE 1 and having a vibration damper constructed in accordance with the principles of the present invention carried therein;

FIGURE 3 is a fragmentary sectional view taken substantially along line III—III of FIGURE 2; and FIGURE 4 is a fragmentary transverse sectional view taken substantially along line IV—IV of FIGURE 3, and showing metal slats laminated with a visco-elastic material pressed against the interior of the boring bar by inflation of a tube coiled about the damper beam, in accordance with the principles of the present invention.

DESCRIPTION OF PREFERRED EMBODIMENT OF INVENTION

In FIGURE 1 of the drawings, I have generally shown a rotating member which may be in the form of a boring bar 10 having a tool holder 11 thereon carrying the usual cutting tools for boring the insides of large diameter relatively long cylinders 12, such as dryer drums for paper machines, calender rolls and other cylindrical members. The boring bar, head stock and infeed dolly are of a conventional construction and form no part of the present invention so need not herein be shown or described further. The boring bar 10 is hollow throughout its length and has an inner cylindrical wall 16 to receive a damping assembly 15 for damping vibrations occurring in said boring bar as it is rotated, to thereby reduce the magnitude of tool chatter. It should herein be understood that while the damping assembly 15 is applied to a boring bar to reduce tool chatter, that its application is not limited to boring bars, but can be applied to reduce flexural vibrations in beams of any kind and particularly beams of circular cross-section that are rotatably mounted for the purpose of transporting, coating, squeezing or in any other way acting on a film of paper, plastic, cloth or any other continuous web of material.

As shown in FIGURE 3, the damping assembly 15 fits within the inner cylindrical bore 16 of the boring bar 10 and is coaxial with the axis of rotation thereof. The damping assembly generally includes a beam 17, shown in FIGURE 3 as being hollow and circular in cross-section, having a hollow interior cylindrical wall portion 18 carrying weights 19 and 20 at each end thereof, and forming a mounting for an air storage rservoir 21 inwardly of the weight 19. An intermediate hollow weight 22 extends along the interior of the shell and is spaced radially inwardly from inner wall 18 thereof by spacers 23, secured to the damper shell, as by machine screws 24.

The weights 19, 20 and 22 provide the mass to bring the natural frequency of vibration of the beam 17 up to an optimum ratio of the natural frequency of the boring bar. The ratio should normally be between 80% and 95% of the first natural frequency of the boring bar, although the exact value of this ratio for optimum conditions is dependent upon the relative sizes of the beam 17 and the boring bar 10. The weights may also be so arranged within the beam 17, that the increments in length of the boring bar subjected to the largest amplitudes of transverse vibration will be subjected to the largest damping forces.

The beam 17 has an elastic tube 25 coiled thereabout for the length thereof. The elastic tube 25 may also be of a viscous character and may preferably be made from rubber or one of the well-known substitutes for rubber, such as an elastomer or other like materials.

Metal slats 26 extend for the length of the beam 17 and are interposed between the outside of the elastic tube 25 and the interior wall 16 of the boring bar 10, and are forced against the interior wall of said boring bar upon inflation of said tube 25. The metal slats extend about the tube 25 in side-by-side relation with respect to each other, and may be inserted in the space between the tube and inner wall 16 of the boring bar after placing the hollow beam 17 in said boring bar in its assembled condition, with the tube 25 coiled thereabout and in a deflated condition. The slats 26 may be made from steel and may have a layer of rubber or rubber-like material 27 laminated to the surface thereof which faces and engages the interior wall 16 of the boring bar, upon inflation of the tube 25. The slats 26, however, need not be laminated with rubber, but may be plain steel slats and also may be laminated with paper, felt and other suitable materials. Paper has been found to give better results than rubber insofar as reducing the amplification of the frequency of vibration, while the plain steel slats are effective in many cases, but do not give as good results as slats covered with rubber or paper. The plain slats and slats covered with the foregoing materials, however, have been found to be very satisfactory for various damping conditions.

It should herein be understood that energy absorption takes place by the shearing action occurring between the slats and boring bar, or where covered with rubber or other materials in the sheets laminated to the slats, as a result of the differential strain between the slats and the boring bar, when flexural motion of the boring bar occurs. Energy absorption also takes place by deformation of the elastic tubing resulting from the fact that the cylindrical wall of the boring bar and the periphery of the shell 17 have different flexural frequencies and different mode shapes.

The far end of the tube 25 is connected with a hose connector 29, suitably mounted on the outside of the weight 20 and having communication with a radially extending air passageway 30 terminating at the center of said weight into an axially extending passageway 31 opening to the inner side of said weight. An axially extending passageway 31 opening to the inner side of said weight. An axially extending tube 32 is connected to the passageway 31 by an adapter fitting 33, threaded in the inner end of the passageway 31. The tube 32 may be in the form of a nylon hose and extends along the interior of the shell 17 along the center of a pipe 35, mounted in and extending along the axial center of the weight 22, and through an aligned pipe 36 extending along the axial center of the reservoir 21. The tube then extends through a central passageway 37 extending along the weight 19 to an adapter fitting 39 mounted in and extending through a bulkhead 40, closing the end of the boring bar 10. A bleeder valve 41 is mounted in the adapter fitting 39 on the outside of the bulkhead 40, to hold air in the tube 25 and thereby close the far end of said tube. The valve 41 may be a well-known form of tire valve, and serves as an air bleed valve to bleed air from the tube 25 when the pressures therein, indicated by a gauge 42, are higher than desirable, or in cases where it may be desirable to deflate the tube 25.

The bulkhead 40 is mounted in a cylindrical flanged closure 43 for the end of the boring bar, which is secured to said boring bar by machine screws 44 extending through the flanged portion of said closure. The closure 43 has an outer cylindrical wall portion 45 extending inwardly along the interior wall 16 of the boring bar, and has an inwardly extending radial shouldered portion 46ª spaced axially outwardly of the weight 19 and spacing the bulkhead 40 from said weight, to form an instrument housing in the space between the weight 19 and the bulkhead 40.

The reservoir 21 is provided to supply air to the tube 25 at a regulated pressure, under the control of a pressure regulator 46, mounted on the inside of the bulkhead 40, and extending inwardly therefrom. The pressure regulator 46 is connected with the gauge 42 through a piping connection 46ᵇ. The reservoir 21 has a front or outer wall 47, having an adapter fitting 47ª threaded therein and extending outwardly therefrom. The adapter fitting 47ª is in the form of an elbow and forms a fitting for a flexible tube 48 leading through a passageway 49 extending along the weight 19 and outwardly of said passageway to the bulkhead 40 and having connection at its outer end with an air bleed valve 50 (FIGURE 2), like the air bleed valve 41, for bleeding air from the reservoir 21. An air gauge 52 is mounted in the bulkhead 40 to indicate the pressure of air in the reservoir 21.

A fitting 53 on the inside of the bulkhead 40 has a pipe 54, leading inwardly therefrom and connected to an adapter fitting 55, in the end wall 47 of the reservoir 21. The fitting 53 is connected with an air fill valve 57 on the outside of the bulkhead 40 through and adapter fitting 58. The fitting 53, in turn has a pipe 61 (FIGURE 2) leading upwardly therefrom and connected with the pressure regulator 46 through an adapter fitting 62. The fitting 53, in turn, is connected with the gauge 52 through a pipe 63 and fitting 64. An elbow 65 leads from the fitting 64 and is connected with the pressure regulator 46 through a pipe 67 and an adapter fitting 67ª threaded in said pressure regulator. An adapter fitting 68 in turn is threaded in the top of the pressure regulator 46 and has a flexible tube 69 connected thereto. The flexible tube 69 is connected with a passageway 69ª leading axially along the weight 19 through an elbow 69ᵇ threaded in the outer end of said passageway. The passageway 69ª terminates into a radially outwardly extending passageway 69ᶜ having communication with a hose connector 70, suitably mounted on and extending outwardly from the weight 19, and forming a hose connector for the front end of the coiled tubing 25, to inflate said tube, as air is admitted to said tubing through the valve 57.

The pressure in both the tube and reservoir may be varied by reducing pressure in the tube or reservoir by bleeding air through the bleed valves 41 or 50. An adjustment knob 71 is provided for adjusting the pressure regulator 46, and the pressure at which air is supplied to the tube 25 through said pressure regulator. It is, of course, obvious that air pressure may be increased by supplying additional air through the air fill valve 53.

It should be understood from the foregoing that the damper of the present invention absorbs energy by the shearing action that takes place, as a result of the differential strain between the steel slats 26 and the interior wall 16 of the boring bar 10, when flexural motion of the boring bar occurs, and also absorbs energy by deformation of the inflated coiled tube 25, resulting from the fact that the inner cylindrical beam or shell 17 and the boring bar 10 have different flexural frequencies and have different mode shapes.

The absorption of energy caused by deformation of the elastic tubing 25 and the different flexural frequencies between the boring bar and inner beam, and the different mode shapes thereof, is an application of the mass damper theory and requires that the first natural frequency of the inner beam be between the ratios of 80% and 95% of the first natural frequency of the boring bar. The exact value of this ratio for optimum conditions is dependent on the relative sizes of the beam 17 and the boring bar 10, as previously mentioned.

The weights 19, 20 and 22 have, therefore, been attached to the inside of the beam 17 to achieve this optimum ratio.

Energy is also absorbed by the coiled tube 25 as a result of the displacement that occurs between inner beam 17 and the boring bar. This displacement is the total effect of rigid body motion between the inner beam 17 and the boring bar, combined with their differences in their first mode flexural shapes.

The damper of the present invention thus provides a distributed damping means which is proportioned along the length of the boring bar in a manner such that the increments in length of the boring bar, subjected to the largest amplitudes of transverse vibration will be subjected to the largest damping forces.

The damper also provides a damping means which can be adjusted to optimum conditions for each of a variety of operating situations by merely changing the air pressure in the coiled elastic tube.

The combination of the two damping effects attained by the damper of the present invention provides an effective vibration damper, with the versatility necessary to adapt itself to a wide variety of back bearing positions at which the boring bar is required to operate, and has been found to be effective to reduce the cyclic forces at the cutting tool to 20% of their undamped value.

While I have herein shown and described one form in which the invention may be attained, it may readily be understood that various modifications and variations in the invention may be effected without departing from the spirit and scope of the novel concepts thereof.

I claim as my invention:

1. An energy absorber for damping flexural vibration in rotating members comprising:
   (a) a rotating member having an interior cylindrical wall,
   (b) a beam floatingly carried within said rotating member and extending for substantially the length thereof,
   (c) an inflatable tube coiled about said beam,
   (d) means closing one end of said tube,
   (e) and other means connected with the opposite end of said tube to accommodate the inflation of said tube to force said tube against the interior cylindrical wall of said rotating member and damp vibration of said rotating member by the shear resistance between said tube and said interior cylindrical wall and by deformation of said tube by the different flexural frequencies between said beam and rotating member.

2. The structure of claim 1, including metal slats interposed between the outer surface of said tube and the interior cylindrical wall of said rotating member in side-by-side relation with respect to each other.

3. The structure of claim 1, including metal slats having sheets of resilient material laminated to the sides of said slats facing the interior cylindrical wall of said rotating member, and interposed between the outer surface of said tube and said interior cylindrical wall, and forced against said interior cylindrical wall by the pressure of air in said elastic tube.

4. The structure of claim 1,
   wherein the elastic tube is made from a rubber-like material; and
   wherein the outer sides of the slats facing the interior cylindrical wall of the rotating member are laminated with layers of rubber-like material.

5. The structure of claim 3,
   wherein the elastic tube is rubber; and
   wherein the outer sides of the slats engageable with the interior cylindrical wall are laminated with paper.

6. The structure of claim 3,
   wherein the elastic tube is rubber; and
   wherein the outer side of the slats engaging the interior cylindrical wall are laminated with felt.

7. The structure of claim 1,
   wherein the beam is hollow and weighted to provide the proper mass to achieve an optimum ratio between the natural frequency of the beam and the shell.

8. The structure of claim 1,
   wherein the beam is a hollow beam,
   wherein means are provided to weight said beam to achieve an optimum ratio between the natural frequency of said beam and said shell, and
   wherein an air reservoir is contained in said beam, and has connection with said tube to maintain a predetermined air pressure in said tube.

9. The structure of claim 8,
   wherein the connection from the reservoir to the tube includes a pressure regulator, regulating the pressure of air in said tube, and
   wherein individual air bleeder valves are connected with said tube and said reservoir to accommodate the bleeding of air therefrom.

10. The structure of claim 8, wherein metal slats are interposed between the outer surface of said tube and the interior cylindrical wall of said rotating member.

11. The structure of claim 10,
    wherein the elastic tube is made from a rubber-like material, and wherein the sides of the slats facing the interior cylindrical wall of said rotating member are laminated with a rubber-like material.

12. The structure of claim 10,
    wherein the elastic tube is made from a rubber-like material, and
    wherein the sides of the metal slats facing the interior cylindrical wall of said rotating member are laminated with paper.

13. The structure of claim 8,
    wherein the means weighting the beam comprises:
    a weight at each end of said beam,
    an intermediate weight between the ends of said beam, and
    wherein the reservoir is carried by said beam inwardly of one of said weights.

14. In a rotatable boring bar having a hollow interior portion,
    (a) energy absorbing means for damping flexural vibration of said bar comprising:
      (1) a beam floatingly carried in the hollow interior portion of said boring bar for rotation therewith and extending substantially the length thereof,
      (2) an elastic tube coiled about the periphery of said beam,
      (3) metal slats extending along the outer surface of said tube in side-by-side relation with respect to each other,
      (4) means closing one end of said tube,
      (5) other means connected with said tube and accommodating the inflation of said tube to force said slats into engagement with the hollow interior portion of said boring bar, and (6) means weighting said beam and providing the mass in said beam to achieve an optimum ratio between the natural frequency of said beam and said boring bar.

15. The structure of claim 14,
wherein the tube is made from a rubber-like material, and
wherein the sides of the slats facing the hollow interior portion of said boring bar are laminated with a rubber-like material.

16. The structure of claim 14,
wherein the beam is hollow,
wherein the means weighting the beam are at each end of the beam, and
wherein the means accommodating inflation of said tube includes an air reservoir contained within said beam and having connection with said tube.

17. The structure of claim 16,
wherein the means connecting the air reservoir to the tube comprises a pressure regulator, and
wherein individual bleeder means are provided for said tube and said air reservoir for independently bleeding air from said tube and said reservoir.

18. The structure of claim 17,
wherein the elastic tube is made from a rubber-like material, and
wherein the slats are steel slats having outer faces having rubber laminated thereto for engagement with a hollow interior of said boring bar to damp flexural vibration of said boring bar by the shearing action that takes place as a result of the differential strain between the steel slats and the boring bar, when flexural motion of the boring bar occurs.

References Cited

UNITED STATES PATENTS 2,960,189 11/1960 Osburn _____ 74—574 XR
3,058,559 10/1962 Ohrnberger.

FRED C. MATTERN, Jr., Primary Examiner

F. D. SHOEMAKER, Assistant Examiner

U.S. Cl. X.R.

77—58